(12) United States Patent
Ogikubo

(10) Patent No.: US 8,249,425 B2
(45) Date of Patent: Aug. 21, 2012

(54) METHOD AND APPARATUS FOR CONTROLLING IMAGE DISPLAY

(75) Inventor: Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1181 days.

(21) Appl. No.: 10/713,834

(22) Filed: Nov. 14, 2003

(65) Prior Publication Data

US 2004/0151471 A1 Aug. 5, 2004

(30) Foreign Application Priority Data

Nov. 15, 2002 (JP) ................................. 2002-332650

(51) Int. Cl.
*G11B 27/00* (2006.01)
(52) U.S. Cl. ...................................................... 386/278
(58) Field of Classification Search ..................... 386/46
See application file for complete search history.

(56) References Cited

U.S. PATENT DOCUMENTS

| 5,519,828 | A | 5/1996 | Rayner |
| 6,345,143 | B2 | 2/2002 | Kanda |
| 6,912,726 | B1 * | 6/2005 | Chen et al. ..................... 725/113 |
| 7,149,408 | B2 * | 12/2006 | Kobayashi ....................... 386/46 |
| 2003/0091329 | A1 * | 5/2003 | Nakata et al. ................... 386/52 |

FOREIGN PATENT DOCUMENTS

| JP | 11-177930 | 7/1999 |
| JP | EP 1 168 833 | 1/2002 |
| JP | 2002-218309 | 8/2002 |
| JP | 2002-247504 | 8/2002 |
| JP | 2002-251869 | 9/2002 |
| JP | 2002-320203 | 10/2002 |

OTHER PUBLICATIONS

Japanese Office Action with English translation.
Premier 5.0/6.0 (Win): Frame rate is changed when the read-in of the sequential file is performed, URL: http://www.adobe.com/jp/support/kb/ts/222/ts_222075_ja-jp.html.
Dig Company, Premiere Digital Video Studio, Japan, Shoeisha Co., Ltd., Sep. 20, 2001, First edition, pp. 101-p. 103.

* cited by examiner

*Primary Examiner* — William C Vaughn, Jr.
*Assistant Examiner* — Daniel Tekle
(74) *Attorney, Agent, or Firm* — Frommer Lawrence & Haug LLP; William S. Frommer; Ellen Marcie Emas

(57) ABSTRACT

When an image is displayed on a material administration browser, a story board window and a time line window based on material data, the editing image display is controlled to display items of the material data that is combined with the frame rate information as the associated information and not combined with the frame rate information as the associated information with the items of the material data being distinguished from each other. When the material data is combined with the frame rate information as the associated information, a speed range available for reproduction of said material data is displayed based on the frame rate information. A console indication in variable speeds for indicating a reproduction speed or for altering the reproduction speed within the speed range available for reproduction is provided. Thus, reproduced image may be displayed on material image representation at set reproduction speed.

9 Claims, 12 Drawing Sheets

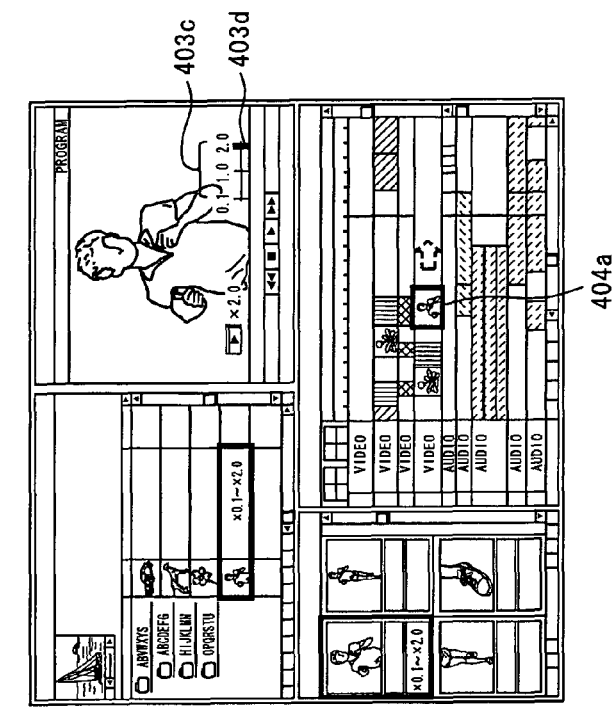
FIG. 9C (TWICE SPEED)
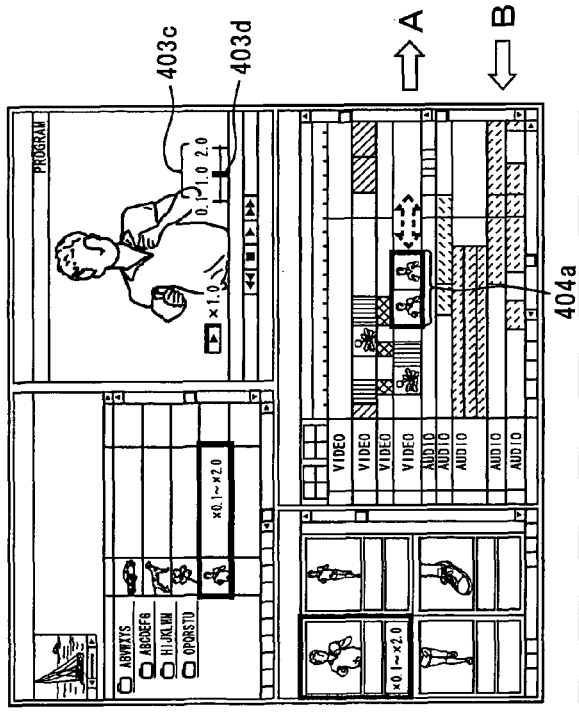
FIG. 9A (NORMAL SPEED)
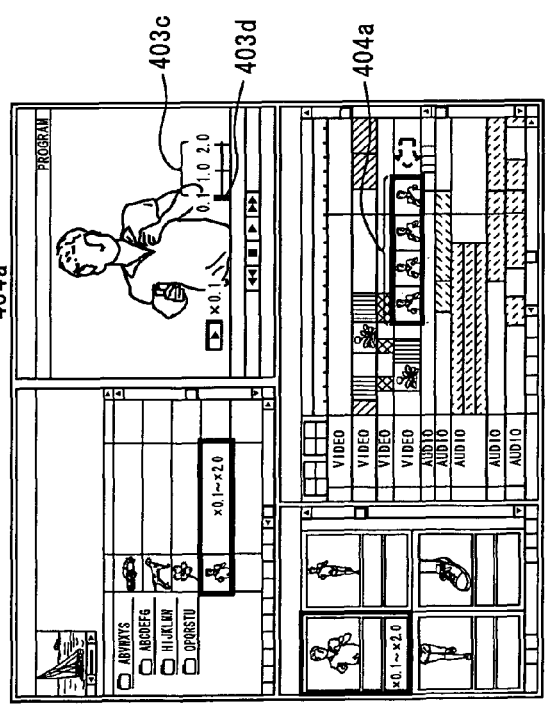
FIG. 9B (1/10 TIMES NORMAL SPEED)

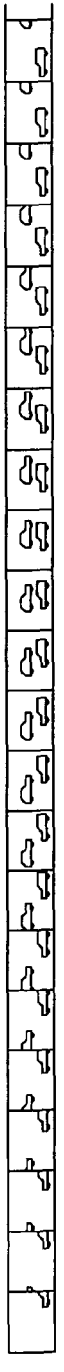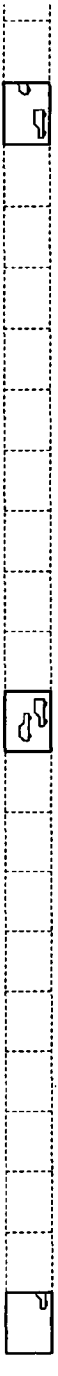
FIG. 10A (DV)
FIG. 10B (DM-FRs)
FIG. 10C (AN)
FIG. 10D (AN)
FIG. 10E (Svm)
FIG. 10F (AN)
FIG. 10G (Svm)

METHOD AND APPARATUS FOR CONTROLLING IMAGE DISPLAY

BACKGROUND OF THE INVENTION

1. Field of the Invention

The invention relates to a method and an apparatus for controlling an editing image display.

2. Related Art

In generation of contents on audio and/or video for broadcasting, a distribution via a communication network or circulation by recording medium, and the like, the contents altering motion speed of a subject partially for only a set period have been used in addition to the content generated at a reference frame rate such as a frame rate of 30 frame/sec, in order to obtain enhanced effects the creator wishes to create.

In such the generation of the contents altering the motion speed of the subject, a higher frame rate relevant to a reference frame rate is illustratively set to generate the contents, and then the contents are reproduced at the reference frame rate so that slow motion content can be produced. Alternatively, a lower frame rate relevant to a reference frame rate is set to generate the contents, and then the contents are reproduced at the reference frame rate so that quick motion content can be produced. Further, adapting the frame rate to be set and the frame rate at the reproduction allows the motion speed of the subject to be freely altered.

Thus, the creator performs an editing process to create the contents using not only the contents generated at the reference frame rate but also the contents of altered motion speed of the subject, in order to obtain the enhanced effects the creator wishes to create.

It has been proposed in Japanese Patent Publication No. H11-177903 that the video camera allows time axis to be compressed or extended in order to generate the content altering the frame rate.

When the creator performs the editing process using not only the contents generated at the reference frame rate but also the contents of altered motion speed of the subject as material, it is not easily determined which of frame rates each content has been generated if merely the images of contents are displayed. Further, when it performs the speed change on the contents of altered motion speed of the subject, it is impossible to determine whether or not the speed change can be performed without any deterioration in image quality of the displayed image. If a frame rate is set (hereinafter, referred to as, "set frame rate") to 10 times the reference frame rate, the reproduced contents are displayed one-tenth in a motion of subject if the content generated at the set frame rate is reproduced at the reference frame rate. Here, it is conceivable that since the set frame rate is 10 times the reference frame rate when the creator wants to display the contents one-fifth in a motion of subject, the speed change can be easily performed without any deterioration in image quality of the displayed image if performing a frame-skipping for each frame. It, however, is impossible to determine whether or not the speed change can be easily performed without any deterioration in image quality of the displayed image, based on merely the displayed image.

It is an object of the present invention to present a method and an apparatus for controlling an editing image display wherein the editing process is easily allowed using material generated at the reference frame rate but also material altering the frame rate.

SUMMARY OF THE INVENTION

According to an aspect of the present invention, an apparatus for controlling an editing image display comprises a determining device for determining whether or not material data is combined with frame rate information as associated information, and a controller for controlling the editing image display to display items of the determined material data that is combined with the frame rate information as the associated information and not combined with the frame rate information as the associated information with the items of the determined material data being distinguished from each other.

According to another aspect of the present invention, a method for controlling an editing image display comprising the steps of determining whether or not material data is combined with frame rate information as associated information, and controlling the editing image display to display items of the determined material data that is combined with the frame rate information as the associated information and not combined with the frame rate information as the associated information so that the items of the determined material data are distinguished from each other.

In this invention, a determining device determines whether or not material data is combined with frame rate information as associated information. Then, a controller for controlling the editing image display to display items of the determined material data that is combined with the frame rate information as the associated information and not combined with the frame rate information as the associated information with the items of the determined material data being distinguished from each other.

Since the items of determined material data that is combined with the frame rate information as the associated information and not combined with the frame rate information as the associated information, respectively, is displayed with the items of the determined material data being distinguished from each other, a user may find out any scene altering motion speed of a subject using the frame rate information of the material data. This allows the editing process to be easily realized using material generated at the reference frame rate but also material altering the frame rate.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 9A through 9C are illustrations each for GUI representation at an editing operation;

FIGS. 10A through 10G are illustrations showing a reproduction operation of the image;

DETAILED DESCRIPTION OF PREFERRED EMBODIMENTS

Figure 1:
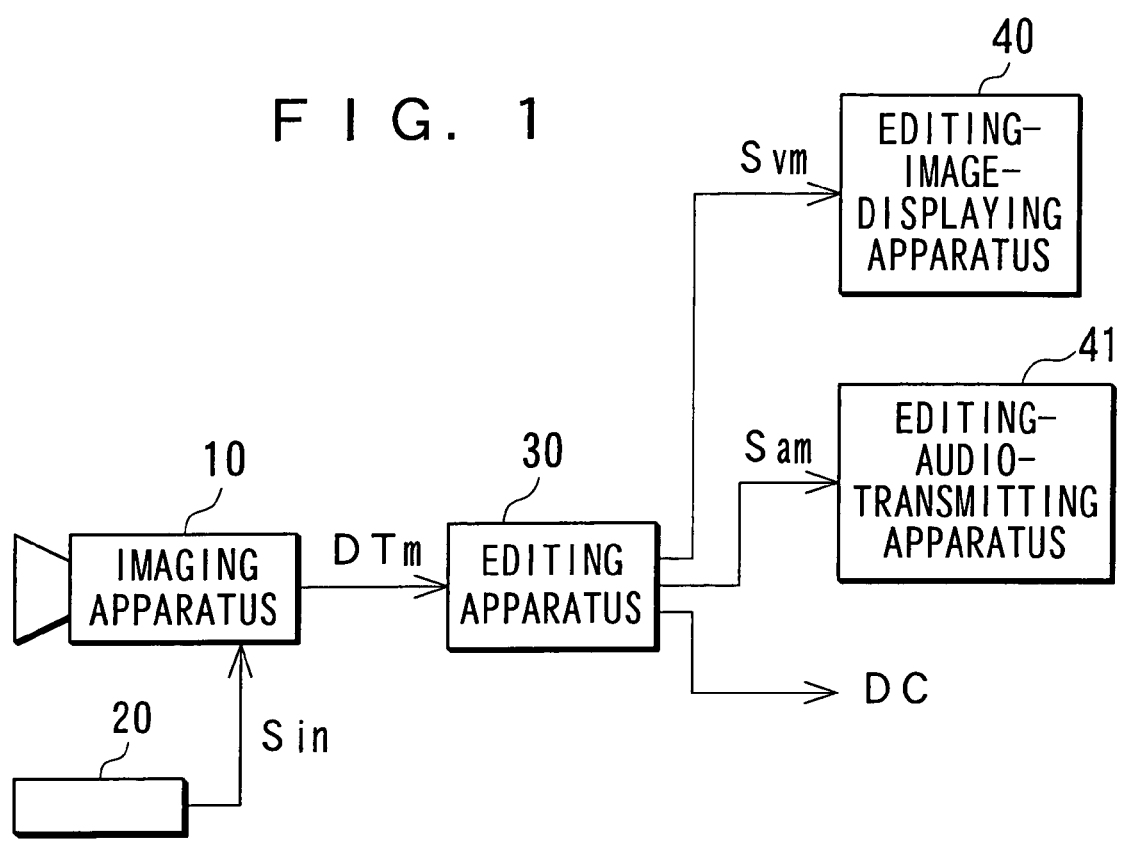
FIG. 1 is a diagram for illustrating a whole configuration of content-editing system.

Referring to the drawings, the invention will now be described in detail with reference to embodiments according to the invention.

FIG. 1 shows an entire configuration of content-editing system for editing the content such as the content for audio and/or video. An imaging apparatus 10 generates image data having its frame rate variably set and combines associated information including frame rate information on the frame rate of the image data with this image data to supply an editing apparatus 30 with the combined ones as material data DTm. When the imaging apparatus 10 is provided with an audio input apparatus 20, it generates audio data to supply the editing apparatus 30 with the audio data and the associated information as material data DTm. The material data DTm may be also supplied from an apparatus, not shown, other than the imaging apparatus 10. The combination is enough if the image data and the associated information including the frame rate information are linked with each other. Thus, if they are recorded on different recording media or supplied through different transmission lines, a connection between them may be established latter when they includes a frame number and the like corresponding to the association information. In this embodiment, the combination includes such the case.

The editing apparatus 30 receives the material data DTm from the imaging apparatus 10 and performs editing process on the received material data DTm to produce and transmit content data DC. The editing apparatus 30 also produces image signal Svm concerning the editing and supplies an editing-image-displaying apparatus 40 with it. This allows a user to verify editing processes and results of images and the like through displayed images on the editing-image-displaying apparatus 40. Similarly, the editing apparatus 30 produces audio signal Sam concerning the editing and supplies an editing-audio-transmitting apparatus 41 with it. This allows a user to verify editing processes and results of audio and the like through transmitted audio from the editing-audio-transmitting apparatus 41.

Figure 2:
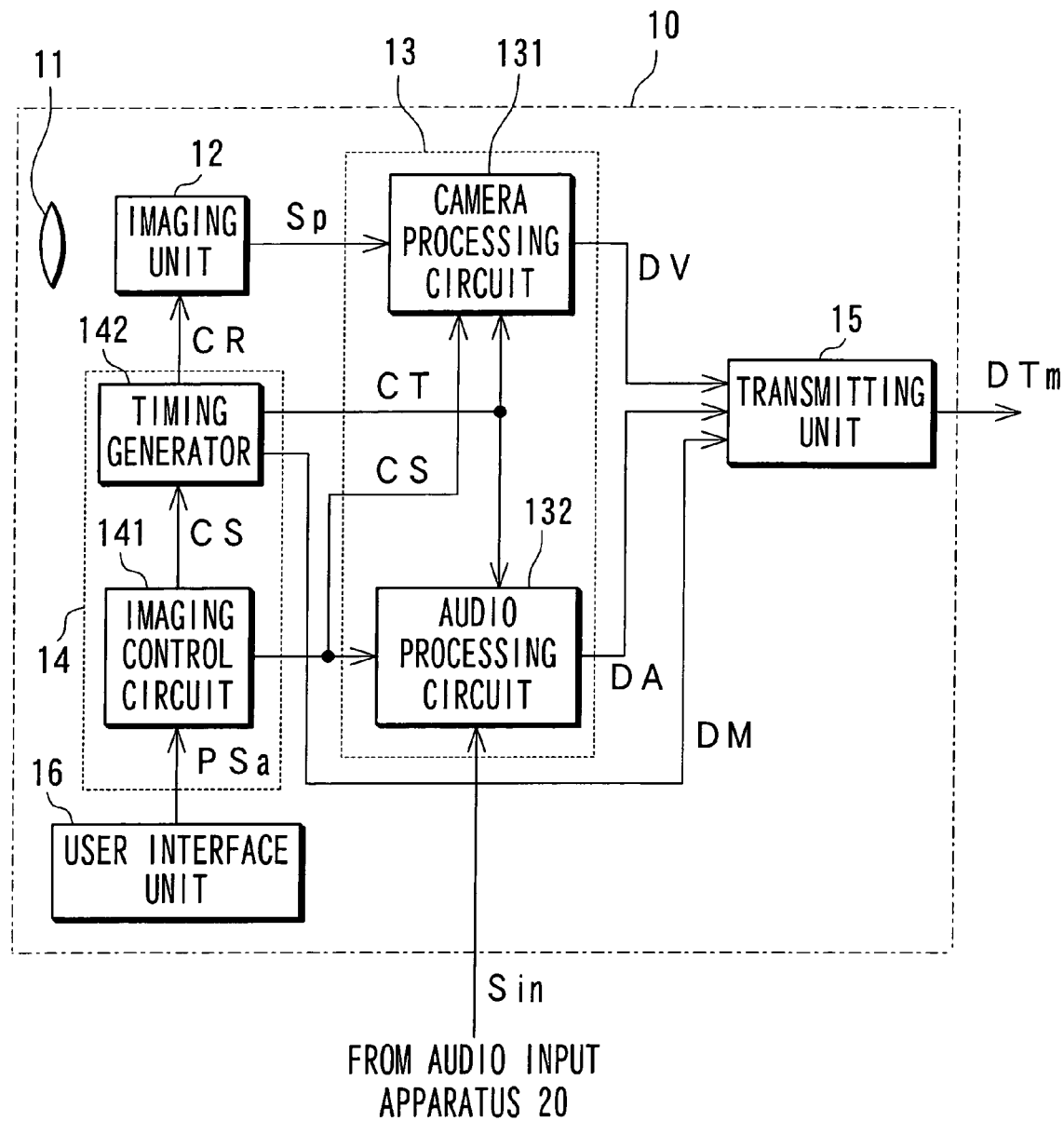
FIG. 2 is a block diagram showing a configuration of imaging apparatus.

FIG. 2 is a block diagram showing a configuration of the imaging apparatus 10. Imaging unit 12 receives incident light through imaging lens system 11 and an image pickup device such as charge coupled device (CCD) mounted within the imaging unit 12 captures subject image on its image surface. The image pickup device generates imaged charge of the subject image though photoelectric transfer characteristics thereof. The imaging unit 12 also reads out the imaged charge thus generated on the basis of driving signal CR from a timing generator 142, which will be described later, and generates imaged signal Sp having a frame rate that corresponds to the driving signal CR to supply camera processing circuit 131 in signal processor 13 with the imaged signal Sp.

Based on timing signal CT received from the timing generator 142, the camera processing circuit 131 performs various signal processing at timings synchronized with the imaged signal Sp. Illustratively, such the signal processing represents noise-reduction processing for reducing noise components from the imaged signal Sp by means of correlated dual sampling or the like, transformation processing from the imaged signal Sp thus noise-reduced to digital image data, clamp processing of the image data, processing on shading correction and pilling-up of deficiency in the image pickup device, γ correction, contour enhancement processing, knee correction, and the like. Further, the camera processing circuit 131 performs other various signal processing under the processing conditions based on the operation control signal CS received from imaging control circuit 141 of controller 14. Thus, the camera processing circuit 131 generates image data DV according to various signal processing and supplies transmitting unit 15 with the image data DV.

The timing generator 142 of controller 14 generates driving signal CR corresponding to operation control signal CS from the imaging control circuit 141 and supplies the imaging unit 12 with the driving signal CR, thereby allowing a reading-out frequency of imaged charge in the imaging unit 12 to be altered. It, then, also controls a frame rate of the imaged signal Sp to be set to a set frame rate FRs based on an operation signal PSa from user interface unit 16. For example, frame frequency, 59.94 Hz or 29.97 Hz in the case of NTSC system or frame frequency, 50 Hz or 25 Hz in the case of PAL system is set to the frame frequency of reference frame rate FRr and an operation such that the set frame rate FRs is set to the one k times the reference frame rate FRr is carried out (k is positive value, not limited to an integer). If so, a frame rate of the imaged signal Sp is controlled to be equal to the one k times the reference frame rate FRr.

Alternatively, altering a period of reading-out pulse (sensor gate pulse) for transferring imaged charge accumulated on each pixel from the respective pixels in an image pickup device such as CCD to transfer unit or the like allows reading-out frequency of imaged charge to be altered, thereby altering the frame rate.

It may be adapted for Common Data Rate (CDR) system in this case. When the CDR system is used, effective frame rate may be altered, and a frame rate of the signal output from the CCD may be constant, thus making processed rate in the camera processing circuit 131 or the like constant.

This CDR system has been generally disclosed in PCT Application No. PCT/JP03/0051 filed on Jan. 22, 2003.

The timing generator 142 also generates the timing signal CT synchronized with the driving signal CR and supplies the camera processing circuit 131 and audio processing circuit 132 with the timing signal CT. The timing generator 142 further generates associated information DM including the set frame rate FRs that is frame rate of image data DV and supplies the transmitting unit 15 with the frame rate information DM.

The imaging control circuit 141 of the controller 14 is connected with the user interface unit 16. When the imaging apparatus 10 performs switching operation and alteration operation of the frame rate, the user interface unit 16 generates operation signal PSa corresponding to these operations and supplies the imaging control circuit 141 with the operation control signal PS. When receiving the operation signal PSa from external equipment such as a remote controller, not shown, the user interface unit 16 also supplies the imaging control circuit 141 with the operation signal PSa.

The imaging control circuit 141 generates operation control signal CS to allow the imaging apparatus 10 to be operated according to the operation signal PSa based on the operation signal PSa received from the user interface unit 16. It also supplies the camera processing circuit 131 and the timing generator 142 with the operation control signal CS.

The audio processing circuit 132 receives analog audio signal Sin from the audio input apparatus 20. The audio processing circuit 132 also performs sampling process on the analog audio signal Sin based on timing signal CT received from the timing generator 142 to generate digital audio data DA and supply the transmitting unit 15 with the digital audio data DA.

The transmitting unit 15 combines the image data DV and the audio data DA with the associated information DM to generate material data DTm. The transmitting unit 15 supplies the editing apparatus 30 with the material data DTm. When the material data DTm or a recording signal produced on the basis of the material data DTm is recorded on recording medium, the material data DTm may be supplied to the editing apparatus 30 by reproducing the material data DTm itself or the material data DTm recorded on the recording medium in the editing apparatus 30.

It is conceivable that as a way to combine the image data DV and the audio data DA with the associated information DM, the associated information DM is inserted into a data stream of image or a header of the data stream when the image data DV and the audio data DA are compressed to generate the material data DTm as the data stream.

Further, it is conceivable that when SDI format standardized as SMPTE (Society of Motion Picture and Television Engineers) 259M, Television-10-Bit 4:2:2 Component and 4fsc Composite Digital Signals-Serial Digital Interface, in order to transfer non-compressed image and audio data, SDTI format standardized as SMPTE 305M, Television-Serial Data Transport Interface (SDTI), in order to transfer compressed image and audio data, or SDTI-CP format standardized as SMPTE 326M, Television-SDTI Content Package Format (SDTI-CP) that obtained by further defining SDTI format is utilized, the associated information DM may be inserted into a signal having each format as UMID data standardized as SMPTE 330M, Television-Unique Material Identifier (UMID). In the present invention, a way to combine the image data DV and the audio data DA with the associated information is not limited to the above ones. Various ways to do so are conceivable.

Figure 3:
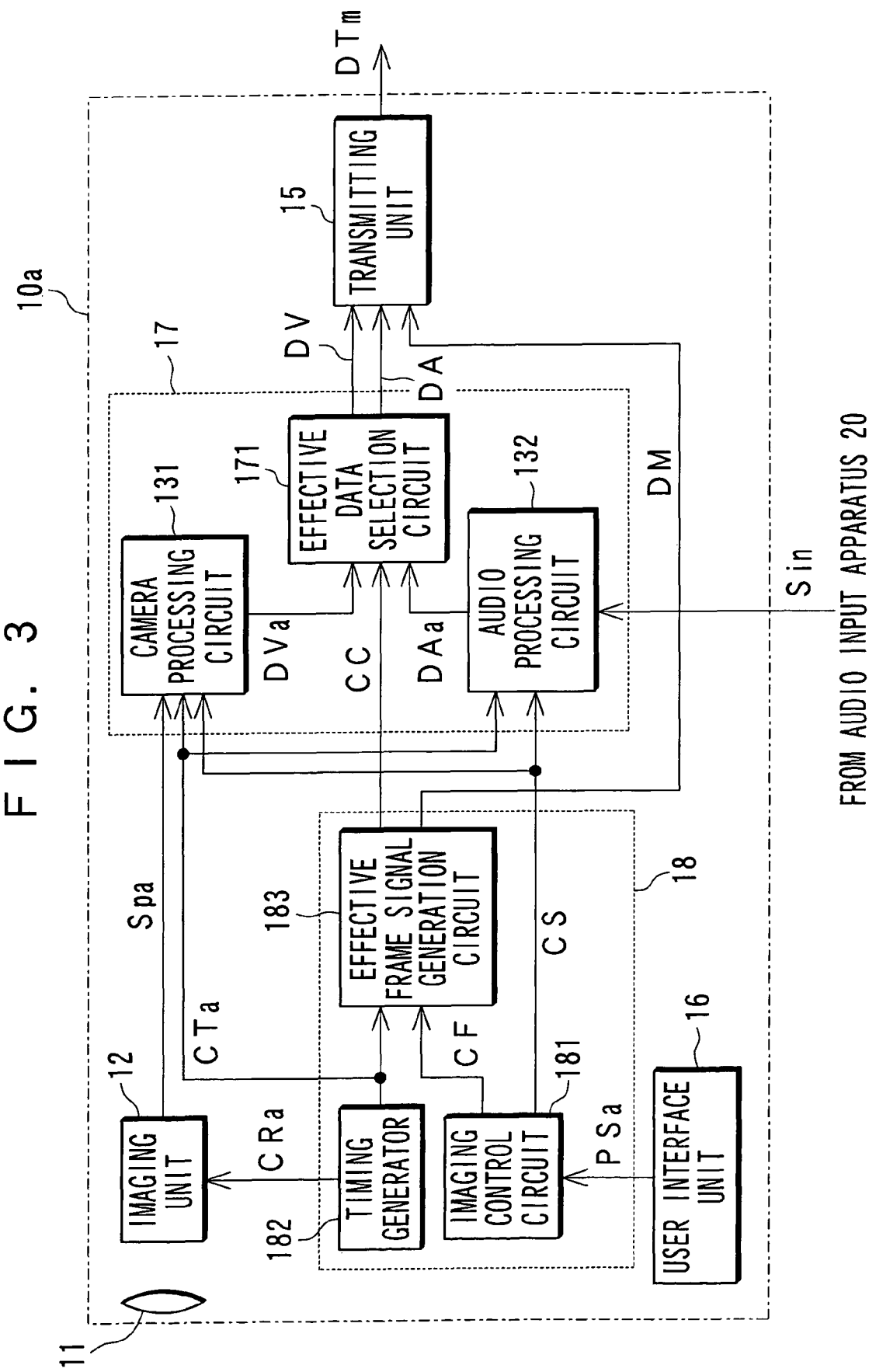
FIG. 3 is a block diagram showing a configuration of another imaging apparatus.

The above imaging apparatus 10 alters read-out frequency of imaged charge in the imaging unit 12 to generate the imaged signal Sp of a predetermined set frame rate FRs. If, however, the imaging apparatus 10 alters no read-out frequency of imaged charge in the imaging unit 12, the imaged signal Sp of the set frame rate FRs may be generated. This is, generating image data DVa having a constant frame rate higher than the set frame rate FRs and extracting image data of only the set frame rate FRs from the image data DVa allow the image data DVa of a predetermined set frame rate FRs to be generated. FIG. 3 shows a configuration of such a case. In FIG. 3, like reference numbers refer to like elements shown in FIG. 2 and thus, the detailed description thereof is omitted.

Timing generator 182 in controller 18 generates driving signal CRa corresponding to the highest value of the set frame rate FRs that is set through user interface unit 16 and supplies the imaging unit 12 with the driving signal CRa. Based on the driving signal CRa, the imaging unit 12 generates imaged signal Spa having a fixed frame rate FRq higher than a reference frame rate. The imaging unit 12 then supplies camera-processing circuit 131 with the imaged signal Spa. When the set frame rate FRs may be altered up to n times (where n is positive number) the reference frame rate FRr, the imaging unit 12 generates the imaged signal Spa having a frame rate n times the reference frame rate FRr, and supplies the camera processing circuit 131 with the imaged signal Spa. In other words, the imaging unit 12 generates the imaged signal Spa having a fixed frame rate without any influence of the set frame rate FRs that is set through the user interface unit 16.

The timing generator 182 also generates timing signal CTa synchronized with the driving signal CRa and supplies the camera processing circuit 131 and audio processing circuit 132 in signal processor 17 and effective frame signal generation circuit 183 in the controller 18 with the timing signal CTa.

The camera processing circuit 131 generates image data DVa of fixed frame rate FRq based on the imaged signal Spa and supplies the effective data selection circuit 171 with the image data DVa. The audio signal processing circuit 132 carries out a sampling based on the timing signal CTa of a fixed frequency to generate audio data DAa and supplies the effective data selection circuit 171 with the audio data DAa.

Imaging control circuit 181 generates a set information signal CF indicating a set frame rate FRs based on operational signal PSa received from the user interface unit 16 and supplies the effective frame signal generation circuit 183 with the set information signal CF.

The effective frame signal generation circuit 183 extracts data on a frame basis from the image data DVa based on a ratio of the fixed value of frame rate FRq of the image data DVa to a value of the set frame rate FRs indicated in the set information signal CF and generates extraction control signal CC for generating image data DV of the set frame rate FRs. The effective frame signal generation circuit 183 also synchronizes the extraction signal CC with the timing signal CTa and supplies the effective data selection circuit 171 with the synchronized extraction control signal CC. When the frame rate FRq of the image data DVa is n times the reference frame rate FRr and the set frame rate FRs is n/2 times the reference frame rate FRr, the effective frame signal generation circuit 183 generates the extraction control signal CC for controlling data extraction on a frame basis every other frame from the image data DVa and supplies the effective data selection circuit 171 with the extraction control signal CC synchronized with the timing signal CTa.

The effective frame signal generation circuit 183 further generates associated information DM having the set frame rate FRs as the frame rate information based on the set information signal CF and supplies the transmitting unit 15 with the associated information DM.

The effective data selection circuit 171 extracts the image data DVa and the audio data DAa of the frame indicated by the extraction control signal CC and supplies the transmitting unit 15 with them as the image data DV and the audio data DA. It is conceivable that the effective frame signal generation circuit 183 may supply the effective data selection circuit 171 with the associated information DM including the set frame rate FRs as the frame rate information, and the effective data selection circuit 171 may perform frame-skipping on the audio data DAa according to a ratio of the set frame rate FRs to a frame rate when the audio data DAa is generated. When the frame rate FRq in generating the audio data DAa is n times the reference frame rate FRr and the set frame rate FRs is n/2 times the reference frame rate FRr, the effective data selection circuit 171 performs the frame-skipping on the audio data DAa every other sample. In this case, since an interval of the frame-skipping may be shortened as compared by a case where performing the frame-skipping on the audio data DAa on a frame basis, audio having an excellent sound quality may be get based on the audio data DA.

Thus, the image data DVa having a fixed frame frequency makes unnecessary the alteration of operation frequencies in the imaging unit 12 and the camera processing circuit 131 of the signal processor 17. This allows configurations of the imaging unit 12 and the camera processing circuit 131 to be made simpler. Since only the data extraction on a frame basis from the image data DVa may generate image data DV of the set frame rate FRs, generating the image data DV of a predetermined set frame rate FRs from the image data Dva is easily allowed.

When the imaging apparatus is provided with video memory or an adder and a divider, it may generate the image data DV by adding the image data every the predetermined frames. This allows a variable range of frame rate in the imaged signal Sp to be limited. Adding the imaged signal Sp of n frames and dividing the signal level by n allows the signal having a frame rate 1/n times the imaged signal Sp to be obtained even if a frame rate of the imaged signal Sp is not divided by n.

FIGS. 4A through 4D and 5A through 5D are diagrams showing relationship between the image data DV generated by the imaging apparatus 10, 10a and the associated information DM.

Figure 4:
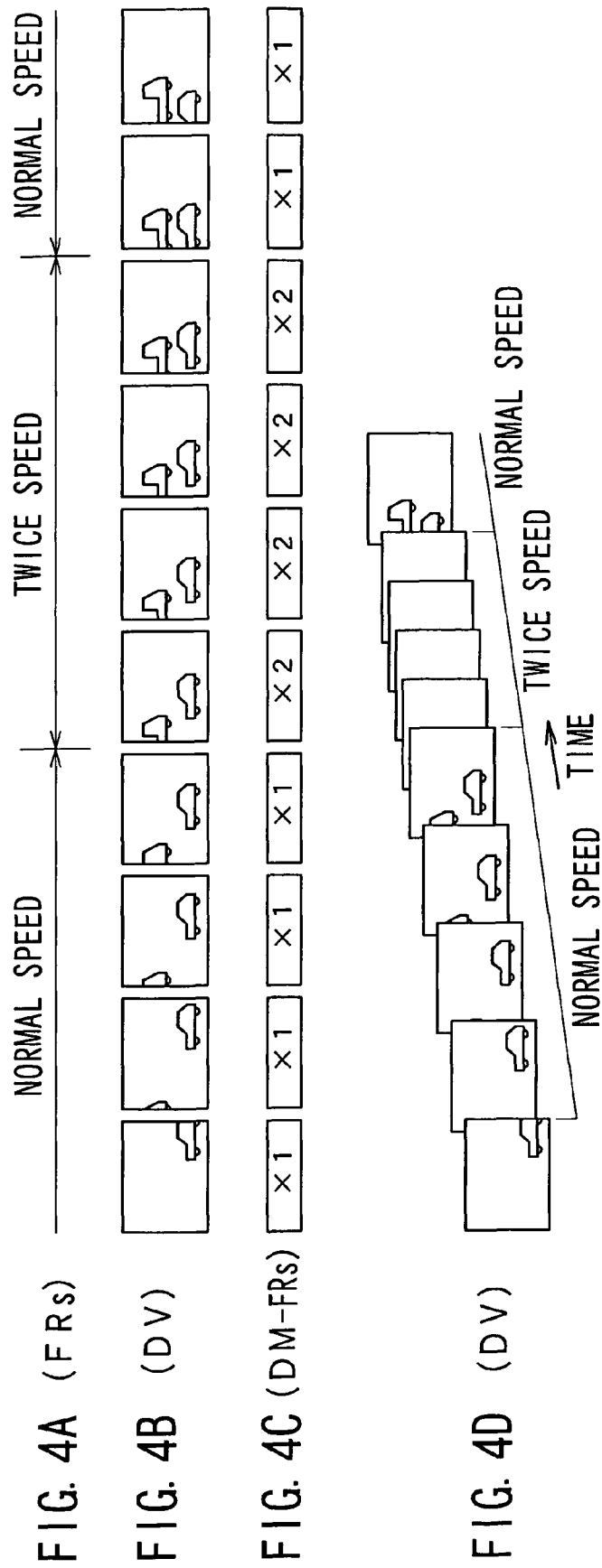
FIGS. 4A through 4D are diagrams showing relationship (part 1) between the image data and the associated information.

When the set frame rate FRs is set to the one equal to or twice the reference frame rate FRr as shown in FIG. 4A, the associated information DM that includes the frame rate information DM-FRs indicating the set frame rate FRs, as shown in FIG. 4C, is combined with image data DV as shown in FIG. 4B (in FIG. 4B, frame images based on the image data DV are shown). FIG. 4D illustrates a relationship between time and the frame images. The frame rate information DM-FRs may include a magnification of the set frame rate FRs to the reference frame rate FRr in addition to the set frame rate FRs. The frame rate information DM-FRs is indicated by the magnification in FIGS. 4C, 5C, and 10B.

Figure 5:
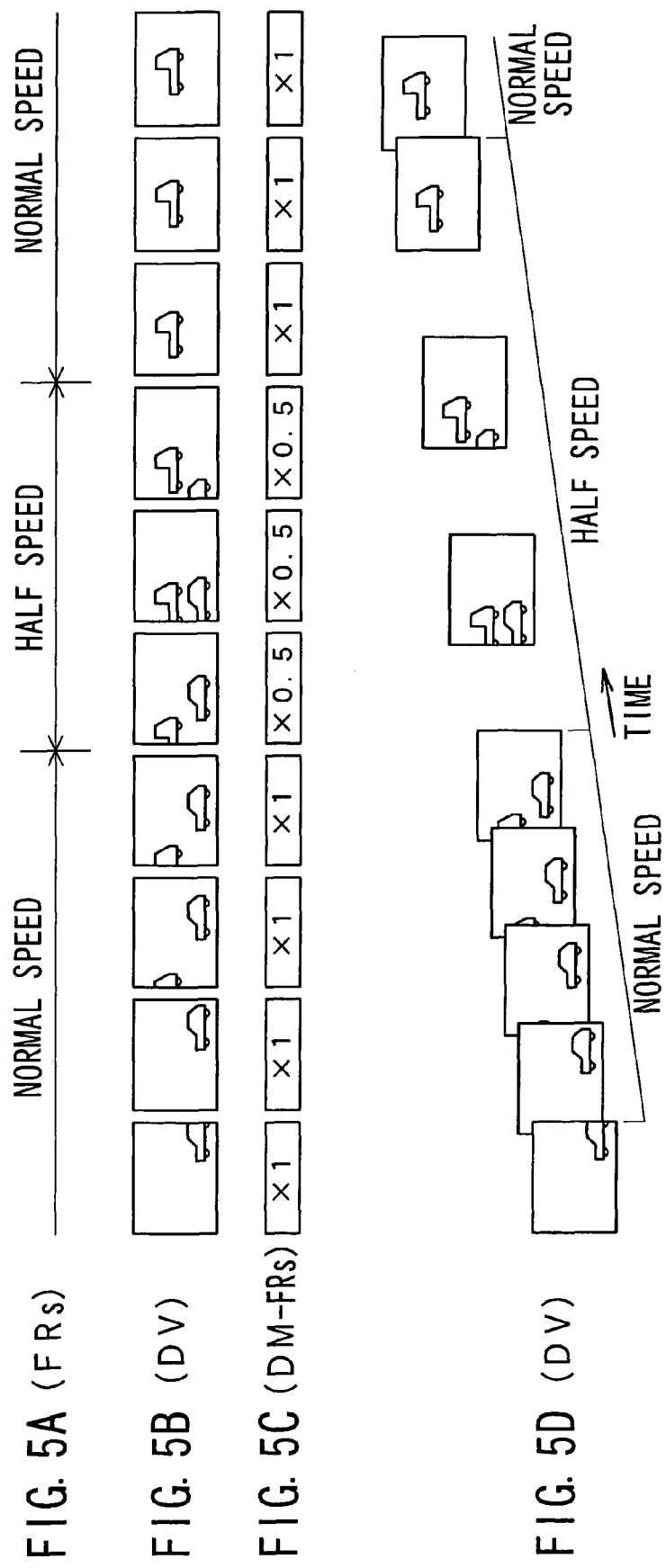
FIGS. 5A through 5D are diagrams showing relationship (part 2) between the image data and the associated information.

When the set frame rate FRs is set to the one equal to or half as much as the reference frame rate FRr as shown in FIG. 5A, the associated information DM that includes the frame rate information DM-FRs indicating the set frame rate FRs, as shown in FIG. 5C is combined with image data DV as shown in FIG. 5B (in FIG. 5B, frame images based on the image data DV are shown). FIG. 5D illustrates a relationship between time and the frame images.

Figure 6:
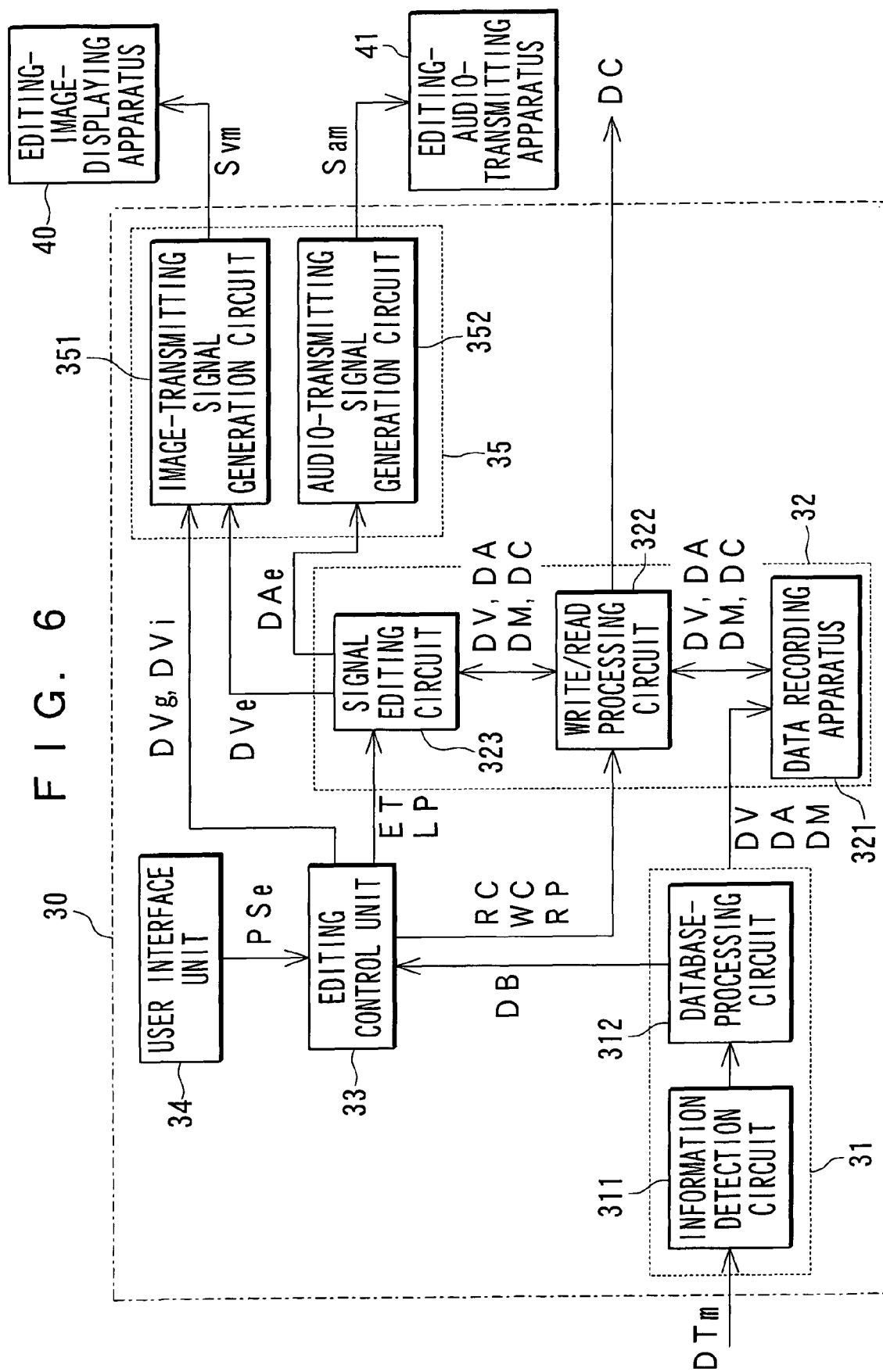
FIG. 6 is a block diagram showing a configuration of an editing apparatus.

The following will be described on the editing apparatus 30. FIG. 6 shows a configuration of the editing apparatus 30. In the editing apparatus 30 receiving material data DTm, an information detection circuit 311 in a material capture unit 31 receives the material data DTm. The information detection circuit 311 detects the associated information DM from the material data DTm. The information detection circuit 311 supplies a database-processing circuit 312 with the associated information DM thus detected. The database-processing circuit 312 also receives image data DV and audio data DA included in the material data DTm.

The database-processing circuit 312 records the image data DV, the audio data DA, and the associated information DM detected in the information detection circuit 311 on data recording apparatus 321 in edition processing unit 32 with the image data DV and the audio data DA being linked to the associated information DM. The database-processing circuit 312 generates database information DB that allows content of material data to be easily verified on the basis of the associated information DM and the image data DV and the audio data DA linked to the associated information DM, which have been recorded on the data recording apparatus 321. The database-processing circuit 312 then supplies editing control unit 33 with the generated database information DB. The database information DB consists of pieces of information such as information for allowing content of material data to be recognized (for example, thumbnails), a time length of the material data, set frame rate FRs, and recorded locations on the data recording apparatus 321.

The editing control unit 33 generates image data DVg for allowing editing process to be carried out under graphical user interface (GUI) environment and image data DVi for allowing representation of content of material data. The editing control unit 33 then supplies image-transmitting signal generation circuit 351 with the image data DVg and DVi. The image-transmitting signal generation circuit 351 generates image signal Svm based on the image data DVg, DVi thus supplied and transmits it to the editing-image-displaying apparatus 40. Thus, supplying the editing-image-displaying apparatus 40 with the image signal Svm allows information on what kind of the material data is recorded or the like to be displayed on a screen of the editing-image-displaying apparatus 40. This image signal Svm is used for image representation for editing.

The editing control unit 33 also controls post-production process. User interface unit 34 that is connected with the editing control unit 33 supplies operational signal PSe to the editing control unit 33 using representation under GUI environment. When the operational signal PSe indicates the selection of any kind of the material data, the editing control unit 33 generates reading control signal RC according to the operational signal PSe. The editing control unit 33 then supplies write/read processing circuit 322 in the edition processing unit 32 with the reading control signal RC. When the operational signal PSe relates to editing operation such as processing and linkage of the material data thus read, the editing control unit 33 generates editing control signal ET according to the operational signal PSe. The editing control unit 33 then supplies signal editing circuit 323 in the edition processing unit 32 with the editing control signal ET. If editing of the material data is finished to bring content data to completion, the editing control unit 33 generates writing control signal WC according to the operational signal PSe when the operational signal PSe indicates recording operation of the content data on the data recording apparatus 321. The editing control unit 33 then supplies write/read processing circuit 322 with the writing control signal WC. The editing control unit 33 also generates transmitting control signal RP according to the operational signal PSe when the operational signal PSe indicates data transmission of the content data. The editing control unit 33 then supplies the write/read processing circuit 322 with the transmitting control signal RP. The editing control unit 33 also generates speed range setting signal LP according to the operational signal PSe when the operational signal PSe specifies reproduction speed range of the content data. The editing control unit 33 then supplies the signal editing circuit 323 with the speed range setting signal LP.

Based on the reading control signal RC, the write/read processing circuit 322 reads required material data out of the data recording apparatus 321 to supply the signal editing circuit 323 with it. Based on the writing control signal WC, the write/read processing circuit 322 also writes the complete content data on the data recording apparatus 321. Based on the transmitting control signal RP, the write/read processing circuit 322 reads required content data DC out of the data recording apparatus 321 to transmit it.

The signal editing circuit 323 performs editing process such as processing, linkage, and deletion of image and audio data based on the editing control signal ET using the image data DV and the audio data DA included in the material data read out of the data recording apparatus 321. In this case, the signal editing circuit 323 supplies the image-transmitting signal generation circuit 351 with the image data DVe before, during or after the editing thereof. The signal editing circuit 323 also supplies the audio-transmitting signal generation circuit 352 with the audio data DAe before, during or after the editing thereof. When frame rates of image and audio data are altered according to the editing process, the signal editing circuit 323 alters the associated information DM together with the edited image and audio data. The signal editing circuit 323 further combines the associated information DMc corresponding to the edited image data DV and the edited audio data DA with the edited image data DV and the edited audio data DA to generate the content data DC. When the signal editing circuit 323 receives the speed range setting signal LP, the signal editing circuit 323 also combines speed range information on the reproduction speed range of the content data DC as the associated information DMc based on the speed range setting signal LP. When the signal editing circuit 323 receives information on title and recommended reproduction speed of the content from the user interface unit 34, the signal editing circuit 323 also combines the information as the associated information DMc. When the signal editing circuit 323 receives information on a reproduction time length of the content data according to the editing process, the signal editing circuit 323 may combines this information as the associated information DMc. When the signal editing circuit 323 receives information on the highest reproduction speed available for reproduction of the content data, the signal editing circuit 323 may combines the information on the highest reproduction speed as the associated information DMc.

The image-transmitting signal generation circuit 351 of edited transmitting signal generation unit 35 generates image signal Svm based on the image data DVg, DVi supplied through the editing control unit 33 and transmits it to the editing-image-displaying apparatus 40, as described above. This allows information on the material data to be displayed under GUI environment. Generating the image signal Svm based on the image data DVe received from the signal editing circuit 323 allows image before, during or after the editing thereof to be verified on the screen of the editing-image-displaying apparatus 40.

The audio-transmitting signal generation circuit 351 transfers the audio data DAe received from the signal editing circuit 323 to analog audio signal Sam and brings it to a desired signal level to supply the editing-audio-transmitting apparatus 41 composed of a speaker, a head hone, and the like with it. This allows audio before, during or after the editing thereof to be verified through audio transmitted from the editing-audio-transmitting apparatus 41.

Thus, when the content data Dc is complete in the editing apparatus 30 according to the post-production process using the material data DTm, the editing apparatus 30 transmits the complete content data DC.

Figure 7:
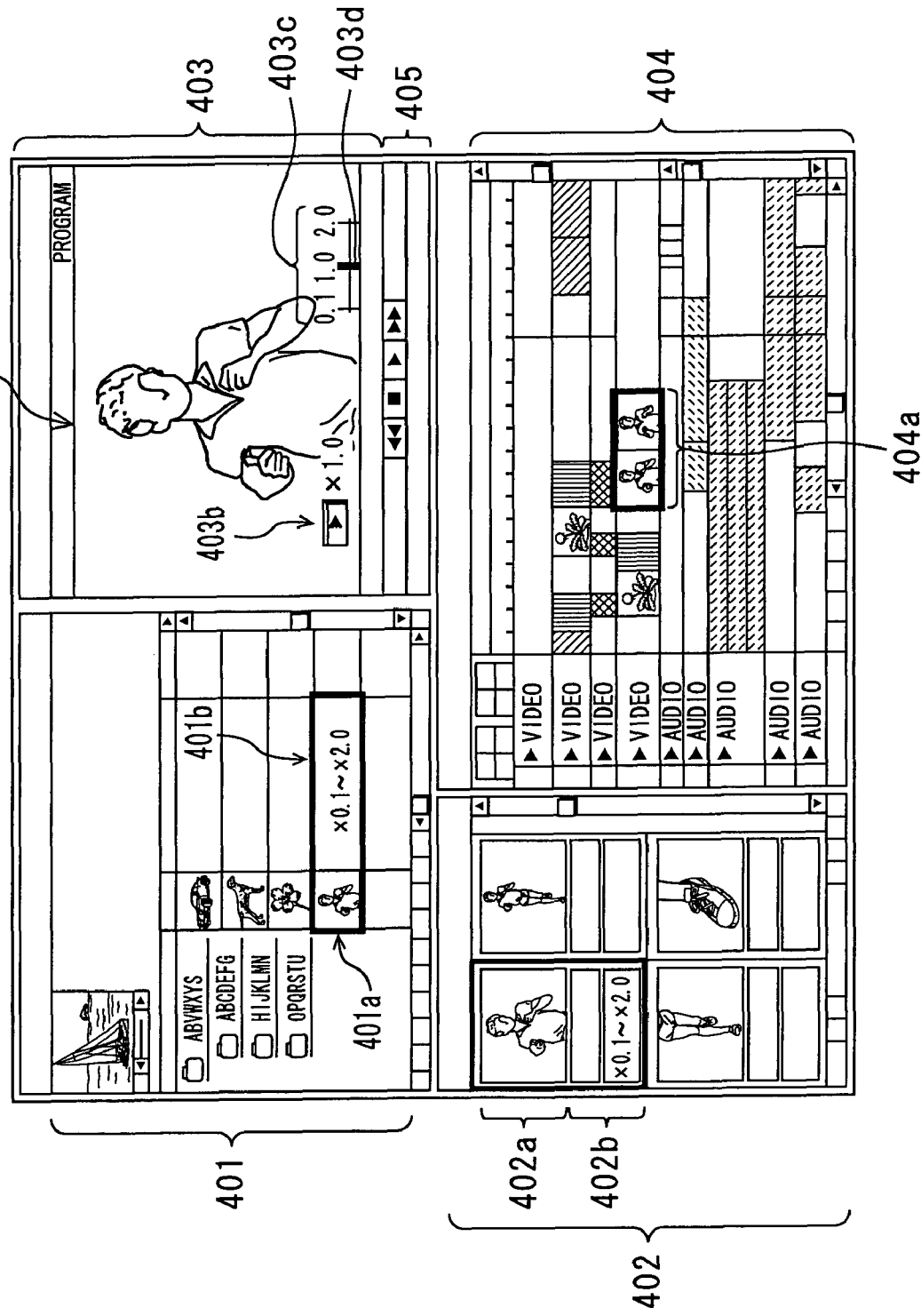
FIG. 7 is an illustration for GUI representation at an editing operation.

The following will be described on operations of the editing apparatus 30. FIG. 7 illustrates GUI representation displayed on the editing-image-displaying apparatus 40 for an editing operation. In the GUI representation, a material administration browser window 401 for displaying a list of items of the material data as material administration display is provided at an upper-left side thereof; a story board window 402 for displaying items of the material data arranged in a reproduction order to create the content as reproduction order display is provided at an lower-left side thereof; a monitor viewer window 403 for displaying an image before or after the editing process as reproduced image display is provided at an upper-right side thereof; and a time line window 404 for allocating the material data along a time axis to create the content as reproduction time order display is provided at a lower-left side thereof. An operation control portion 405 is provided between the monitor viewer window 403 and the time line window 404. Locations and sharps of the material administration browser window 401, the story board window 402, the monitor viewer window 403, the time line window 404, and the operation control portion 405 are respectively illustrative ones and thus, of course, they are not limited to the above locations and sharps.

The material administration browser window 401 shows a list of items of the material data stored in the data recording apparatus 321. For each item of the material data, a stamp view (a thumbnail view) for indicating a title, a length, content of items of the stored material data, a speed range available for reproduction wherein noise-less natural image may be reproduced, and the like are shown.

The story board window 402 serves as a working area for a creation of content. Arranging the items of material data on the reproduced order allows the content to be created. The story board window 402 also display a speed range available for reproduction.

The monitor viewer window 403 represents not only an image based on the material data but also a variable speed bar for indicating a speed range available for reproduction and a location of reproduction speed within the speed range.

The time line window 404 serves as a working area for a production of content according to a more detailed method to allocate items of the material data along a time axis. The time line window 404 also alters an indicated width of the material data according to a reproduction time calculated based on the production speed.

The operation control portion 405 represents an operation key for reproducing the items of material data and the content arranged on the time line window 404.

Based on the represented GUI images and the operational signal PSe received from the user interface unit 34, the editing control unit 33 determines whether or not a drag-and-drop operation, a key-in operation in the operation control portion 405, and the like are carried out. If the editing control unit 33 determines that the drag-and-drop operation and the like have been carried out, it controls operations of the editing apparatus 30 according to such the drag-and-drop operation and the like.

Figure 8:
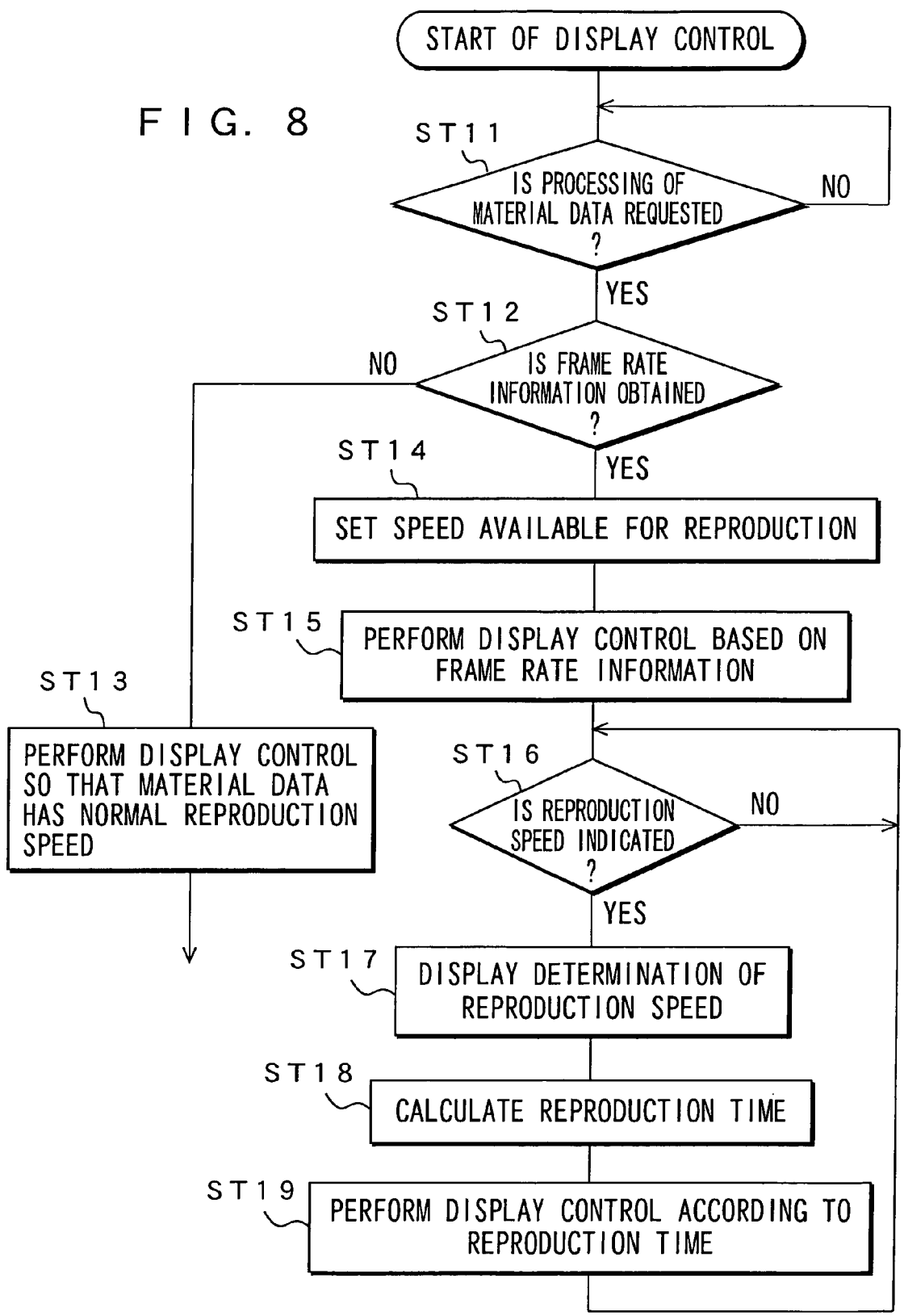
FIG. 8 is a flowchart showing a display control at the editing operation.

FIG. 8 is a flowchart showing a display control at the editing operation.

At step ST11, the editing apparatus 30 determines whether or not the processing of the material data is requested. If no processing of the material data is requested, the process goes back to the step ST11. If the processing of the material data is requested, the process goes to step ST12.

At step ST12, the editing apparatus 30 determines whether or not frame rate information DM-FRs indicating the set frame rate FRs is obtained from the material data to be edited. When the editing apparatus 30 determines that no frame rate information DM-FRs indicating the set frame rate FRs is obtained from the material data referring to the database information DB, the process goes to the step ST13 where the editing apparatus 30 performs display controls so that the material data has same reproduction speed as a normal reproduction speed. When the editing apparatus 30 determines that the frame rate information DM-FRs is obtained from the material data, the process then goes to step ST14.

At step ST14, a speed available for reproduction is set based on the set frame rate FRs indicated by the frame rate information DM-FRs. This speed is set so that a noise-less natural reproduction image can be realized through a frame-skipping of a predetermined frame period or a frame repetition. If a multiple of the set frame rate FRs to the reference frame rate FRr is more than one, namely, FRs/FRr>1, the speed available for reproduction is set by searching for the divisors of this multiple other than one and calculating the reciprocals of the searched divisors. If the set frame rate FRs is 10 times the reference frame rate FRr, the divisors of this multiple, 10 other than one are of 2, 5, and 10 and thus, the reciprocals thereof are of ½, ⅕, and ⅒, respectively. Selection of one of the reciprocals of divisors allows the speed available for reproduction to be set to less than the same reproduction speed as normal reproduction speed. When the speed available for reproduction not less than the same reproduction speed as the normal reproduction speed is set to positive integer multiples of the normal reproduction speed, the frame-skipping periods in each of the speeds available for reproduction may be equal to each other. An upper limit of the speed available for reproduction is set to a speed available for grasping the content of material data easily.

If a multiple of the set frame rate FRs to the reference frame rate FRr is less than one, namely, FRs/FRr<1, the speed available for reproduction is set by searching for the reciprocals of this multiple and calculating the divisors of the searched reciprocals other than one or integer multiples of the searched reciprocals. If the set frame rate FRs is ⅙ times the reference frame rate FRr, the divisors of the searched reciprocals other than one are of 2, 3, and 6 and the integer multiples of the reciprocals are of 6, 12, 18, - - - , respectively. Selection of one of them allows the speed available for reproduction to be set. This allows frame-skipping periods or numbers of the frame repetitions in each of the speeds available for reproduction may be equal to each other. The speed available for reproduction of less than the same speed as the normal reproduction speed is set to the one/positive multiples the normal reproduction speed. This allows numbers of the frame repetitions in each of the speeds available for reproduction to be equal to each other. Since, however, this is concerned with a repetition of images, a lower limit of the speed available for reproduction may be set to the same reproduction speed as the normal reproduction speed.

At step ST15, the editing apparatus 30 performs display control corresponding to the frame rate information DM-FRs, namely, to display so that it can be determined that the material data is combined with the frame rate information DM-FRs indicating the set frame rate FRs, as the associated information, and to display the speed range available for reproduction set based on the set frame rate FRs. For example, in the material administration browser window 401 and the story board window 402, in order to easily determine that the material data is combined with the frame rate information DM-FRs, a contour, a color, and the like of a frame of stamp view 401a, 402a are made different from them of the material data that is not combined with the frame rate information DM-FRs. When an information-representing regions 401b, 402b each for representing information on the material are provided, the speeds available for reproduction set in step ST14 are displayed in each of the regions. For example, in FIG. 7 and FIGS. 9, which will be described later, when the material data is combined with the frame rate information DM-FRs, the frame having its enlarged width is displayed and the speed range available for reproduction is indicated as being "×0.1 through ×2.0".

In the time line window 404, similar to the cases of the material administration browser window 401 and the story board window 402, it is possible to easily determine that the material data is combined with the frame rate information DM-FRs indicating the set frame rate FRs, as the associated information. For example, a contour, and a color of a frame of frame image representation region 404a are made different from them of the material data that is not combined with the frame rate information DM-FRs.

In the time line window 404, an operation is also carried out such that an indicated width of the frame image representation region 404a is adjusted along a horizontal direction, i.e., time axis direction thereof according to the set frame rate FRs. If the set frame rate is greater than the reference frame rate FRr, a number of frame images per unit of time increases. Thus, an indicated width of the frame image representation region 404a is enlarged along the horizontal direction. If the set frame rate is smaller than the reference frame rate FRr, a number of frame images per unit of time decreases. Thus, an indicated width of the frame image representation region 404a is shortened along the horizontal direction. The monitor viewer 403a is provided with a reproduction speed indication 403b and a console indication 403c for variable speed corresponding to the set speeds available for reproduction in addition to material image view 403a based on the material data to display the reproduced image, the reproduction speed, and the speeds available for reproduction. At the same time, a sliding cursor 403d represented by a short bold line in the console indication 403c for variable speed is slid to a cursor position representing the reproduction speed. Thus, this allows the control direction to be determined.

At step ST16, the editing apparatus 30 determines whether or not the reproduction speed is indicated via the user interface unit 34. When an operation is carried out such that the indicated width of the frame image representation region 404a is altered or the sliding cursor 403d in the console indication 403c represented in the monitor viewer window 403 is slid, the process goes to step ST17. When no reproduction speed is indicated, the process goes back to step ST16.

At step ST17, the editing apparatus 30 determines the indicated reproduction speed to display the reproduction speed thus determined. For example, when an operation such that the indicated width of the frame image representation region 404a is altered is carried out in the time line window 404, a reproduction speed is selected in sequence from the speeds available for reproduction set at step ST14 depending on the operational direction to set the reproduction speed when completing the operation. When the sliding cursor 403d in the console indication 403c represented in the monitor viewer window 403 is slid, a reproduction speed is selected from the speeds available for reproduction set at step ST14 depending on a cursor position to set the selected speed to the reproduction speed.

When the reproduction speed is determined, the indicated reproduction speed is shown in the reproduction speed indication 403b of the monitor viewer window 403. When a reproduction speed is indicated according to the operation such that the indicated width of the frame image representation region 404a is altered with the sliding cursor 403d in the console indication 403c and the indicated width of the frame image representation region 404a being in synchronization with each other, the sliding cursor 403d in the console indication 403c represented in the monitor viewer window 403 is slid to a position corresponding to the indicated reproduction speed to display the reproduction speed. When a reproduction speed is indicated according to the operation such that the sliding cursor 403d in the console indication 403c represented in the monitor viewer window 403 is slid, the indicated width of the frame image representation region 404a is altered to a width according to the corresponding reproduction speed. Thus, the sliding cursor 403d in the console indication 403c and the indicated width of the frame image representation region 404a being in synchronization with each other allows the reproduction speed to be correctly altered using either of these two methods.

At step 18, based on the indicated reproduction speed, the editing apparatus 30 calculates reproduction time when reproducing the material data at the indicated reproduction speed. For example, when the set frame rate FRs is 10 times the reference frame rate FRr, a slow speed available for reproduction is of any one of "1/10, 1/5, and 1/2" of the normal reproduction speed. For example, if the reproduction time of the material is 30 seconds when the reproduction speed is the same speed as normal reproduction speed, the reproduction time when the reproduction speed is 1/10 times the normal reproduction speed is 300 seconds. The reproduction time when the reproduction speed is 1/5 times the normal reproduction speed is 150 seconds. Thus, multiplying the reproduction time when the reproduction speed is the same speed as normal reproduction speed by the reciprocal of the reproduction speed allows the reproduction time to be calculated.

At step ST19, the editing apparatus 30 performs a display control according to the reproduction time thus calculated. For example, the indicated width of the frame image representation region 404a in the time line window 404 is altered according to the reproduction time calculated at step ST18, and the process goes back to step ST16. During reproduction operation of the material data, the reproduced image when reproducing the material data at the indicated reproduction speed is displayed as the monitor viewer 403a for displaying the material image of the monitor viewer window 403.

If the reproduction time on a scene of a part of the material data is altered, the scene is split and then, the above process is conducted on the split scenes, thereby allowing alteration of the reproduction time.

FIGS. 9A through 9C are illustration each for GUI representation at an editing operation using the material data combined with the frame rate information DM-FRs indicating that, for example, the set frame rate FRs is 10 times the reference frame rate FRr.

FIG. 9A illustrates the GUI representation where the reproduction speed is the same speed as the normal reproduction speed. FIG. 9B illustrates the GUI representation where the reproduction speed is a tenth the normal reproduction speed. FIG. 9C illustrates the GUI representation where the reproduction speed is twice as much as the normal reproduction speed. Concerning the material data combined with the information on the set frame rate FRs, a frame representation of viewer is carried out in such a way different from a case of the material data not combined with the frame rate information DM-FRs indicating the set frame rate FRs in the story board window 402 and the time line window 404.

When reproducing the selected material data, the set frame rate FRs is determined on the basis of the frame rate information DM-FRs, and then, such a calculation that the reproduction speed FP multiplied by the set frame rate FRs equals a determined value FD is performed. Reproduction process conditions are determined on the determined value FD. When the reproduction speed is the same speed as the normal reproduction speed as shown in FIG. 9A and the set frame rate FRs is 10 times the reference frame rate FRr, the reproduction speed FP multiplied by the set frame rate FRs equals the determined value FD as (1*10=10).

FIG. 10A illustrates images based on the image data DV where the set frame rate FRs is 10 times the reference frame rate FRr. FIG. 10B illustrates the frame rate information DM-FRs indicating the set frame rate FRs of each of the frame images. FIG. 10C illustrates the absolute frame numbers AN of the frame images.

When the determined value FD is set to 10, namely, FD=10, as shown in FIGS. 10D and 10E, the image signal Svm is generated using every 10 frames, namely, with the image data of nine frames being skipped. This allows reproduced image having same speed as the normal reproduction speed to be represented on the monitor viewer 403 based on the image signal Svm. FIG. 10D illustrates the absolute frame numbers AN of the frame images. FIG. 10E illustrates frame images represented on the monitor viewer 403a of the monitor viewer window 403 by the image signal Svm.

An operation is carried out such that an indicated width of a frame image representation region 404a in the time line window 404 is enlarged along a direction indicated by an arrow A or a sliding cursor 403d represented by a short bold line in the console indication 403c for variable speeds is slid in a direction indicated by an arrow B. In this case, a processing as the slow motion of reproduction is performed. For example, when the speed available for reproduction is set to 1/10 times the normal reproduction speed, a reproduction speed indication 403b in the monitor viewer window 403 is altered to "×0.1" as shown in FIG. 9B. At the same time, the sliding cursor 404d is slid to a cursor position representing a tenth times the normal reproduction speed in the console indication 403c. Since the long reproduction time is required, the indicated width of the frame image representation region 404a is also enlarged, as shown in FIG. 9B.

If the speed available for reproduction is set to 1/10 times the normal reproduction speed as shown in FIG. 9B, the determined value FD is set to one, namely, FD=10*(1/10)=1. When the determined value FD is set to one, namely, FD=1, the image signal Svm is generated using every FD=1 frame of the image data DV, namely, without any frame being skipped. This allows the reproduced images having a tenth times the normal reproduction speed to be represented on the monitor viewer 403a of the monitor viewer window 403 based on the image signal Svm, as shown in FIG. 10A.

An operation is carried out such that an indicated width of the frame image representation region 404a in the time line window 404 of FIG. 9A is shortened along a direction indicated by an arrow B or a sliding cursor 404d in the console indication 403c is slid on a direction indicated by an arrow A in the monitor viewer 403. In this case, a processing as the quick motion of reproduction is performed. For example, when the speed available for reproduction is set to twice as much as the normal reproduction speed, a reproduction speed indication 403b in the monitor viewer window 403 is altered to "×2.0" as shown in FIG. 9C. At the same time, the sliding cursor 403d is slid to a cursor position representing twice of the normal reproduction speed in the console indication 403c. Since the short reproduction time is required, the indicated width of the frame image representation region 404a is shortened, as shown in FIG. 9C.

If the speed available for reproduction is set to twice of the normal reproduction speed as shown in FIG. 9C, the determined value FD is set to 20, namely, FD=10*2=20. When the determined value FD is set to 20, namely, FD=20, the image signal Svm is generated using every 20 frames, namely, with the image data of nineteen frames being skipped. This allows the reproduced images having twice speed as much as the normal reproduction speed to be represented on the monitor viewer window 403 based on the image signal Svm, as shown in FIGS. 10F and 10G. FIG. 10F illustrates the absolute frame numbers AN of the frame images. FIG. 10G illustrates frame images represented on the monitor viewer 403a of the monitor viewer window 403 by the image signal Svm.

Thus, the noise-less slow reproduction may be easily realized using the frame rate information DM-FRs and frame-skipping on a frame basis based on the reproduction speed. An operation for altering reproduction speed may be realized during the reproduction process, so the reproduced image may be verified at a desired reproduction speed at easy.

Since the reproduction speed and the indicated width are displayed with them being linked with each other, a relationship between the reproduction speed and the expands and contracts of time axis may be easily grasped, thereby allowing the editing operation to be easily conducted. Further, when the frame image representation region 404*a* is provided with an indication for indicating a direction where the indicated width of the frame image representation region 404*a* can be altered, namely, a direction where the reproduction speed can be altered, for example, an arrow indication illustrated by the dotted lines in FIGS. 9, it is possible to find out the direction where the reproduction speed can be altered, at easy.

Figure 11:
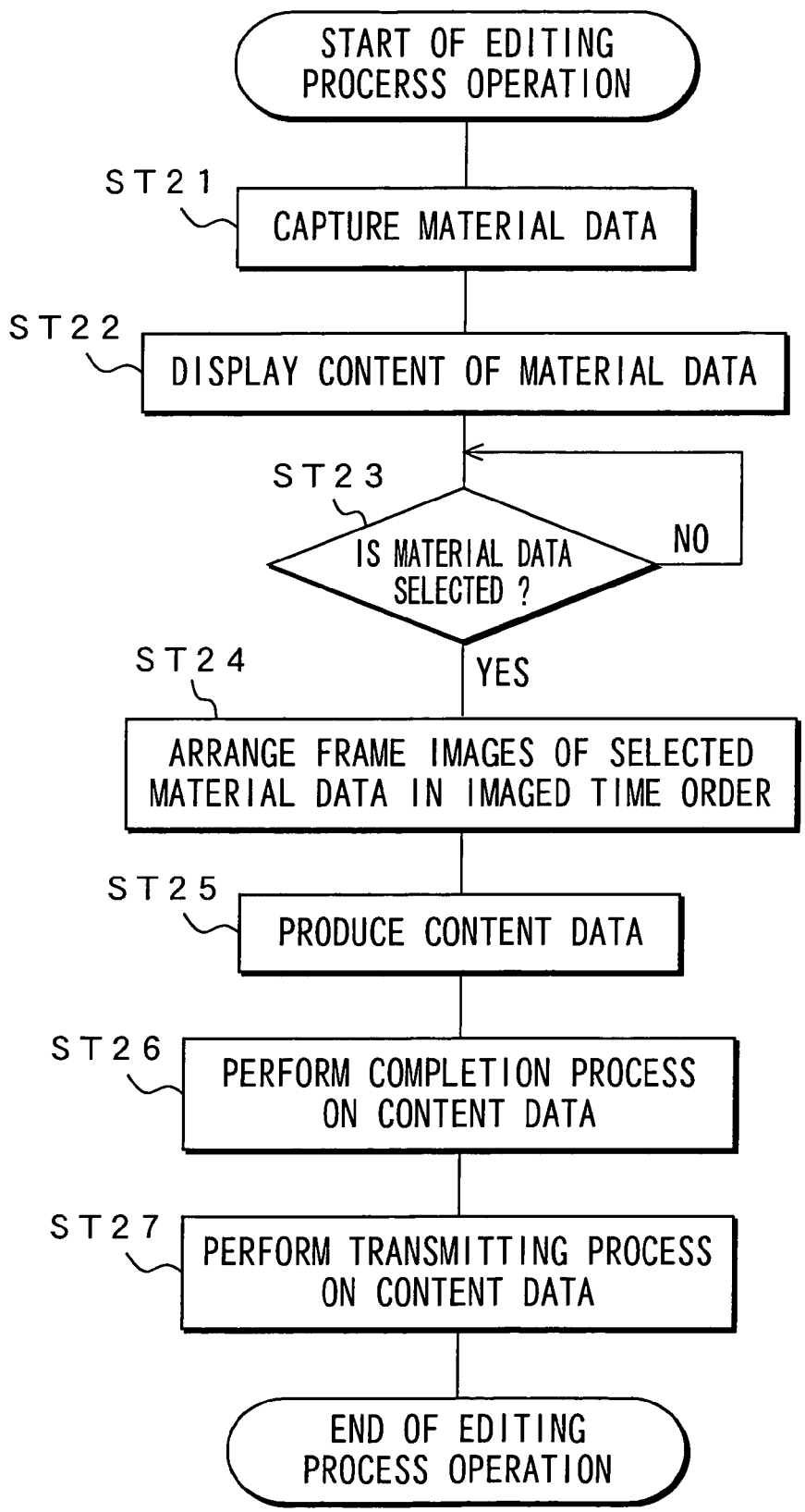
FIG. 11 is a flowchart showing an editing process operation.

FIG. 11 is a flowchart showing an editing process operation using the GUI representation for the performing display control, for example, the one shown in FIG. 8, and for the editing, for example, the one shown in FIG. 9.

At step ST21, the editing apparatus 30 captures the material data. It then records the captured material data on the data recording apparatus 321 and generates the database information DB.

At step ST22, the editing apparatus 30 displays the content of the captured material data using the database information DB. Displaying the content of the captured material data is carried out so that the material administration browser window 401 may display a stamp view and information of the captured material data. When any material data displayed on the material administration browser window 401 is selected, the monitor viewer window 403 displays image of the selected material data. When a reproduction control key operation is done in the operation control portion 405 provided between the monitor viewer window 403 and the time line window 404, the editing apparatus 30 reproduces the material data, stops the reproduction, and reproduces the material at various speeds, according to the key operation and then the monitor viewer window 403 displays the reproduced image.

At step ST23, the editing apparatus 30 determines whether or not the material data is selected. If the material data is not selected, the process goes back to step ST23. If the material data is selected, the process goes to step ST24. When the material data is selected so that a drag-and-drop is done from the material administration browser window 401 to the time line window 404, the process goes to step ST24.

At step ST24, the editing apparatus 30 arranges frame images generated based on the selected material data in an imaged time order and displays them on the frame image representation region 404*a* of the time line window 404.

At step ST25, the editing apparatus 30 processes the material data according to various editing operations such as cut and paste or replacement of the frame images displayed on the time line window 404. The editing apparatus 30 then generates desired image and audio data to create the content data. Alternatively, the editing apparatus 30 combines the associated information DMc indicating the set frame rate and the like with the image and audio data to create the content data.

At step ST26, the editing apparatus 30 performs various completion processes on the content data created at step ST25 such as process on bridges of the material data, addition enhancement of effects, and synthesis of image and audio to be added.

At step ST27, the editing apparatus 30 performs transmitting process on the content data. That is, the editing apparatus 30 transmits the complete content data as program data for broadcasting to a program-sending apparatus. Alternatively, it transmits the complete content data as content data for distribution to a content-sending apparatus. The editing apparatus 30 performs authoring process such as addition of information for carrying out a special reproduction and the like to the complete content data, the special reproduction corresponding to a menu list for reproducing the content or a reproduction menu. The editing apparatus 30 then records the data thus authored on the recording medium.

The above editing process by the editing apparatus 30 may be also realized through a software process using a computer.

Figure 12:
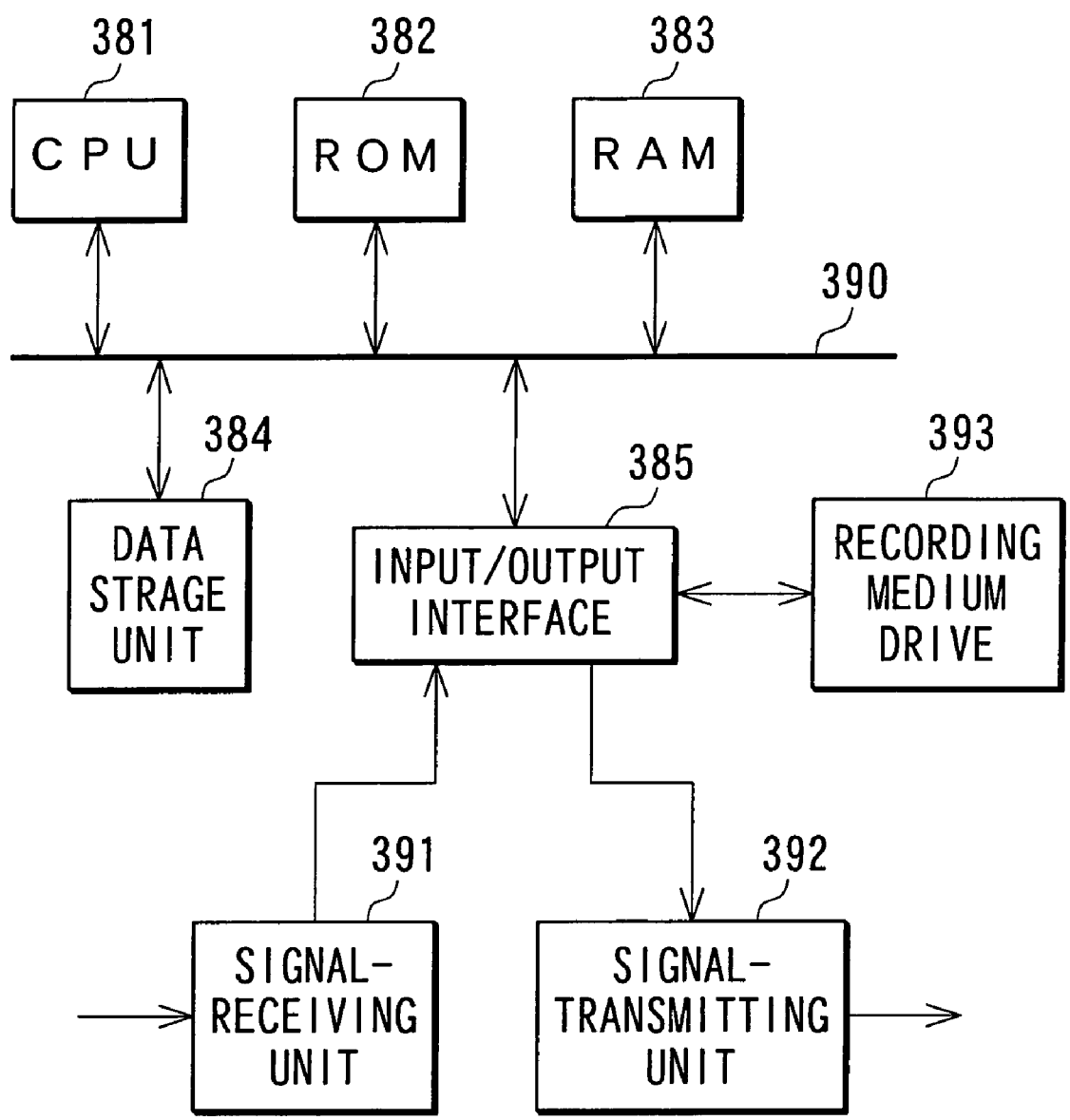
FIG. 12 is an illustration illustrating a configuration of a content-editing system for editing content by means of software.

FIG. 12 shows a configuration of a content-editing system for editing content by means of software.

The computer builds in a central processing unit (CPU) 381 as shown in FIG. 12. ROM 382, RAM 383, data storage unit 384 composed of hard disk drive with a large storage capacity and the like, and an input/output interface 385 are connected with the CPU 381 via bus 390. Signal-receiving unit 391, signal-transmitting unit 392, and recording medium drive 393 are connected with the input/output interface 385.

The CPU 381 run programs stored on the ROM 382, the RAM 383 or the data storage unit 384 to perform the editing processes as shown in FIG. 8 and FIG. 11. The data storage unit 384 stores material data, which the signal-receiving unit 391 receives, via the input/output interface 385 and the bus 390. Material data to be used for editing is read from the material data stored on the data storage unit 384, and the editing process is performed using it to store the complete content data on the data storage unit 384 again. The complete content data stored on the data storage unit 384 is read out and transmitted through the signal-transmitting unit 392.

It is conceivable that a program for performing the editing process may be previously stored on the ROM 382 or the data storage unit 384. A program for performing content-sending process stored on the recording medium or a program stored on the recording medium may be read out and run. A program may be transmitted through wired or wireless transmission line. A received program may be run in the computer.

Thus, according to the embodiments, the material data that is combined with the frame rate information as the associated information and not combined with the frame rate information is displayed, respectively, so that the material data can be determined. This allows a scene available for reproducing a slow motion image to be easily found out using the frame rate information of the material data. A speed range available for reproduction is displayed on the basis of the associated information, thereby allowing a variable speed reproduction to be realized setting a speed within the speed range. This permits effects of image expression to be easily enhanced.

The editing apparatus 30 may also provide the content having a wide speed range available for reproduction using the material data effectively if it may generate the content data without any frame rate of the material data being reduced.

The invention has been described in detail with reference to specific embodiments of the invention in the form of the editing apparatus 30. It should be understood that the invention is not be limited to the embodiments and that the invention can be applied equally well to other types of electronic apparatuses. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for controlling an image display comprising:
    a determining unit configured to determine if image data is combined with frame rate information indicating at least a number of frames per second at which the image data was generated, wherein image data not combined with the frame rate information having a normal reproduction speed and image data combined with the frame rate information having a reproduction speed different from the normal reproduction speed; and
    a controller configured to control the image display to display (a) a frame image representation region displaying said image data in a horizontal direction along a time axis in a reproduction order, a width of the frame image representation region in the horizontal direction representing a reproduction time of the image data, and (b) reproduction speed indicating region displaying (1) a speed range available for reproduction and (2) a currently displayed reproduction speed within the speed range,
    wherein when said image data is not combined with the frame rate information, the width of the frame image representation region in the horizontal direction is automatically displayed according to the normal reproduction speed and when said image data is combined with the frame rate information, the automatic display of the width of the frame image representation region in the horizontal direction is altered according to a reproduction time calculated based on the reproduction speed different from the normal reproduction speed, and
    wherein when the speed range is altered in the reproduction speed indicating region, the display of the width of the frame image representation region in the horizontal direction is automatically altered to correspond thereto.

2. The apparatus according to claim 1, wherein said controller sets a speed range available for reproduction on said image data based on said frame rate information, and said controller controls the image display to display said set speed range.

3. The apparatus according to claim 2, wherein said controller controls said image display to display an indication for indicating the reproduction speed.

4. The apparatus according to claim 2, wherein said controller controls the image display to display said set speed range with an indication for indicating the reproduction speed;
    wherein said indication varies in synchronization with alteration according to an operation for altering said indicated width of said image data in said frame image representation region; and
    wherein said indicated width of said frame image representation region varies in synchronization with alteration according to an operation for adjusting the indication.

5. The apparatus according to claim 1, wherein said indicated width of the frame image representation region becomes longer when the reproduction speed of said data materials is altered to be slower, while said indicated width of the frame image representation region becomes shorter when the reproduction speed of said data materials is altered to be faster.

6. The apparatus according to claim 1, wherein the reproduction speed of said image data becomes slower when said indicated width of the frame image representation region is altered to be enlarged, while the reproduction speed of said image data becomes faster when said indicated width of the frame image representation region is altered to be shortened.

7. A method of controlling an image display, comprising:
    determining if image data is combined with frame rate information indicating at least a number of frames per second at which the image data was generated, wherein image data not combined with the frame rate information having a normal reproduction speed and image data combined with the frame rate information having a reproduction speed different from the normal reproduction speed; and
    displaying, in a frame image representation region, said image data in a horizontal direction along a time axis within the image display, a width of the frame image representation region in the horizontal direction representing a reproduction time of the image data, and displaying, in a reproduction speed indicating region, (a) a speed range available for reproduction and (b) a currently displayed reproduction speed within the speed range,
    wherein when said image data is not combined with the frame rate information, the width of the frame image representation region in the horizontal direction is automatically displayed according to the normal reproduction speed and when said image data is combined with the frame rate information, the automatic display of the width of the frame image representation region in a horizontal direction is altered according to a reproduction time calculated based on the reproduction speed different from the normal reproduction speed, and
    wherein when the speed range is altered in the reproduction speed indicating region, the width of the frame image representation region is automatically altered to correspond thereto.

8. A non-transitory computer-readable storage medium encoded with computer readable instructions that, when executed within a computer, cause the computer to carry out a method of controlling an image display, comprising:
    determining if image data is combined with frame rate information indicating at least a number of frames per second at which the image data was generated, wherein image data not combined with the frame rate information having a normal reproduction speed and image data combined with the flame rate information having a reproduction speed different from the normal reproduction speed; and displaying, in a frame image representation region, said image data in a horizontal direction along a time axis in a reproduction order within the image display, a width of the frame image representation region in the horizontal direction representing a reproduction time of the material data, and displaying, in a reproduction speed indicating region, (a) a speed range available for reproduction and (b) a currently displayed reproduction speed within the speed range,
    wherein when said image data is not combined with the frame rate information, the width of the frame image representation region in the horizontal direction is automatically displayed according to the normal reproduction speed and when said image data is combined with the frame rate information, the automatic display of the width of the frame image representation region in the horizontal direction is altered according to a reproduction time calculated based on the reproduction speed different from the normal reproduction speed, and wherein when the speed range is altered in the reproduction speed indicating region, the width of the frame image representation region is automatically altered to correspond thereto.

9. An apparatus for controlling an image display comprising:

a determining unit configured to determine if image data is combined with frame rate information indicating at least a number of frame per second at which the image data was generated, wherein image data not combined with the frame rate information having a normal reproduction speed and image data combined with the frame rate information having a reproduction speed different from the normal reproduction speed; and a controller configured to control the image display to display at least a frame image representation region displaying said image data along a time axis in a reproduction order, wherein when said image data is not combined with the frame rate information, the width of the frame image representation region along the time axis is automatically displayed according to the normal reproduction speed and when said image data is combined with the frame rate information, the automatic display of the width of the frame image representation region along the time axis is altered according to a reproduction time calculated based on the reproduction speed different from the normal reproduction speed.

* * * * *